United States Patent [19]

Kadane et al.

[11] 4,164,589
[45] Aug. 14, 1979

[54] MEAT PUMPING PROCESS

[75] Inventors: Victor V. Kadane, Langen, Fed. Rep. of Germany; Edwin W. Meyer, Chicago; Robert W. Whitney, Mundelein, both of Ill.

[73] Assignee: Central Soya Company, Inc., Fort Wayne, Ind.

[21] Appl. No.: 939,240

[22] Filed: Sep. 5, 1978

Related U.S. Application Data

[63] Continuation-in-part of Ser. No. 761,424, Jan. 21, 1977, abandoned.

[51] Int. Cl.$^2$ .............................................. A23L 1/31
[52] U.S. Cl. ................................. 426/281; 426/265; 426/266; 426/332; 426/634; 426/641; 426/652; 426/656; 426/662

[58] Field of Search ................... 426/93, 96, 97, 264, 426/265, 266, 268, 281, 302, 309, 332, 634, 641, 645, 647, 648, 652, 656, 662

[56] References Cited

U.S. PATENT DOCUMENTS

| | | | |
|---|---|---|---|
| 2,101,547 | 12/1937 | Kistler | 426/264 |
| 2,629,311 | 2/1953 | Graves | 426/281 X |
| 2,994,085 | 7/1961 | Teich | 426/281 X |
| 3,506,455 | 4/1970 | Savage et al. | 426/281 |
| 3,988,511 | 10/1976 | Schapiro | 426/96 X |
| 3,989,851 | 11/1976 | Hawley et al. | 426/281 X |

*Primary Examiner*—Arthur L. Corbin
*Attorney, Agent, or Firm*—Tilton, Fallon, Lungmus & Chestnut

[57] ABSTRACT

A meat pumping process employing a readily dispersible, soy protein isolate which is non-gellable upon heating and which has a polar lipid material on the surface thereof.

3 Claims, No Drawings

MEAT PUMPING PROCESS

This application is a continuation-in-part of our co-pending application Ser. No. 761,424 filed Jan. 21, 1977, now abandoned.

BACKGROUND AND SUMMARY OF INVENTION

This invention relates to a meat pumping process employing soy protein isolate and, more particularly, a non-gelable, soy protein isolate which is rapidly dispersible in water to provide a portion of the pumping medium, i.e., "brine".

The pumping of hams with brine, sometimes referred to as "pickle", probably antedates recorded history. The most common salt employed is sodium chloride which provides curing (color), preservative (shelf life) and organoleptic (taste) functions. Also, for a long time, the salt has been augmented by sugar which also provides the same type of functions. Because the addition of the brine permitted the possible addition of excess water, most authorities have provided stringent regulations on the weight increase in hams due to salt solution addition. However, there was and is a natural limitation as to the amount of water which can be introduced into a ham for the purpose of preservation and taste, i.e., moistening, because of loss on cooking. This, irrespective of the type of curing salts, common supplements to the sodium chloride being sodium nitrite and sodium erythorbate, both of which enhance color.

Extensive investigation was made of various phosphates which were believed to have the ability to bind additional water in meat fibers—and increasingly following World War II, various polyphosphates were added to the brine solution. None of the salts in the brine provided any nutritional value, particularly of a protein nature.

Starting in the mid 1960's, soy protein isolate was viewed as an especially attractive supplement to the brine to permit the introduction of more fluid while maintaining the nutrition level, particularly relative to protein. Soy protein isolate (sometimes referred to as "isolated soy protein"), is defined as the major proteinaceous fraction of soybeans prepared from high quality, sound, clean dehulled soybeans by removing a preponderance of the non-protein components and containing not less than 90% protein (N×6.25) on a moisture free basis. This definition was accepted by the United States Food and Drug Administration as well as the Technical Service Division, Consumer and Marketing Service, United States Department of Agriculture (1961).

Notwithstanding the opportunity of introducing more effective brine through the use of soy protein isolate, the technique was not formally recognized by the United States Department of Agriculture until May 28, 1976. This recognition was justified as meeting the need to better utilize existing sources of protein in replacing meat with protein from less costly sources. Some commercial activity utilizing soy protein isolate as part of the brine had occurred in the United States in the ten years preceding formal recognition but the bulk of the commercial activity has occurred in Europe.

Starting in the mid-1960's, a large number of ham processors augmented the brine with a soy protein isolate marketed by Central Soya Company, Inc. under the make "PROMINE". This soy protein isolate conforms to the foregoing definition, being prepared from selected, defatted soybean flakes obtained by the solvent extraction processing of high quality, sound, clean, dehulled soybeans. These flakes are treated in mildly alkaline aqueous medium to extract the soluble protein constituents, carbohydrates, mineral matter, and other soluble minor flake components from insoluble matter.

The protein-containing extract is then separated from residual flake material and subsequently acidified to about pH 4.5 with food-grade hydrochloric acid. This results in the precipitation of the major globulin fractions of the soybean protein as a finely-divided white curd. This curd is then separated, washed with water, and dispersed at about pH 7.0 with food-grade sodium hydroxide. The resulting protein dispersion is spray dried.

A typical soy isolate augmented brine employed over the years in Europe included 4% isolate, 10% salts including the chloride and nitrite, 3% phosphate and 3% sugar including monosodium glutamate with the remainder water. In some cases, higher or lower concentrations of isolate were employed. The concentration of the isolate was generally a matter determined by customer taste and it was found that there were distinct preferences in different countries. For example, Spanish ham processors desired a less pink ham than those in France. A variety of differences in taste, appearance, etc. could be found in the products in the other countries employing isolate during the past decade, viz., Holland, Poland, Norway, Denmark, Sweden, etc.

This isolate augmented brine has been pumped into hams both via the arterial-venous system and by stitch pumping. Stitch pumping has come to be preferred because it is faster and more economical, and is more reliable, not being subject to vein or artery rupture or blockage.

Generally the concentrations of isolate in the brine were maintained at a level of about 5%—this primarily being due to the difficulty in rapidly developing the isolate dispersion and thereafter handling the same incident to pumping. It will be appreciated that a ham processing plant is not normally characterized by the refinements and techniques of the analytical laboratory so that higher isolate concentrations which were feasible under more controlled conditions were normally avoided because of the essential ruggedness of the working conditions in ham processing plants.

It was felt desirable to be able to increase the concentration of isolate in the brine—for a number of reasons. Principally, this would permit increasing the effective weight of hams with proportionately less costly ingredients. However, to be acceptable, the water-isolate relationship should be such that after cooking, the isolate was present in the remaining water at a level comparable to the percentage of protein actually present in the ham, viz., 17–20%. So it was not just a matter of utilizing the water binding power of isolate—the isolate concentration had to be stepped up as more water was employed.

The increase in water was beneficial in a different sense—it made the inclusion of the other brine constituents easier. For example, the amount of salt, sugar, phosphates, etc. employed is dependent on the weight of the ham to be cured. With only a small amount of water addable, the constituents are present in relatively concentrated form. For example, in pumping a 10 lb. ham with 10% of brine, only 1 lb. of water is available as the solvent. This meant that approximately 0.025 lbs. of the phosphates (the most difficult of the constituents to dissolve) had to be dissolved in the 1 lb of water. However, if the pump could go to 50% of the green weight of the ham, 5 lbs. of water would be available to dissolve the same 0.025 lbs. of phosphates. Thus, there was real interest in increasing the concentration of the isolate in the brine.

The deterrent to this increase has been the viscosity of the isolate solutions at higher concentrations. Even with stitch pumping, the brine could not be used advantageously—plugging the needles and failing to diffuse completely through the muscle structure. For example, an upper limit of 10% isolate in the brine was recognized in U.S. Pat. No. 3,989,851, and a level of 7-8% was exemplified. And even to get this increase it was necessary to first dissolve the isolate with prolonged, violent agitation and thereafter add the remaining constituents in dry form. This posed an additional problem relative to the phosphates which are difficult to get into solution—the preferred manner being to dissolve the phosphates separately and then add the phosphate solution to the isolate solution. But this was self-defeating because the additional water associated with the phosphates would reduce the effective concentration of the isolate.

Further, it was long recognized in the commercial art that it was imperative to add the isolate to the water before the salts in order to get a stable solution—and this even in the lower isolate concentrations.

Thus, it would be advantageous to provide a brine that would (1) permit the use of higher isolate concentrations, (2) permit addition of salt solutions, particularly the phosphates, (3) achieve rapid solution of the isolates without the need for expensive agitation equipment, and (4) even, in some cases, avoid the criticality of adding the isolate first.

This had been achieved according to the instant invention by employing a unique isolate, more particularly one that provides a relatively low viscosity brine even with isolate concentrations above 12%. Further, in contrast to the isolate recommended in U.S. Pat. No. 3,989,851, the isolate of this invention is non-gelable upon heating. The dispersability of the non-gelling isolate is improved through augmenting the isolate with a minor amount (up to about 2%) of a polar lipid material such as a lecithin, a monoglyceride, a monodiglyceride, or a monopropylene glycol ester. Additional details thereon can be found in the co-pending application of Meyer and Whitney, Ser. No. 761,425, filed Jan. 21, 1977.

DETAILED DESCRIPTION

In general, the steps of processing soybeans so as to obtain edible isolated soy protein include screening, cracking, dehulling until full fat flakes are developed. These are solvent extracted to provide white flakes which are then further extracted and spray dried as mentioned previously so as to provide edible isolated soy protein.

To produce a soy protein isolate which is especially advantageous in the practice of this invention, the isolated soy protein produced as above is combined with a minor amount of a lipid material. This is achieved advantageously by placing the isolate in a blender and then spraying onto the isolate from about 0.2% to about 2.0% of melted lipid material. In one preferred form, advantagesous results were obtained using 0.35% commercial lecithin heated to about 135° F. on the spray dried particles of non-gelable soy protein isolate.

Contrary to the teaching of the prior art, the soy protein isolate especially useful in the practice of the invention is not characterized by a gel formation upon heating. A widely recognized test for determining gel formation of soy proteins can be found in the May 1964 issue of *Cereal Chemistry,* Volume 41 in an article entitled "Rheology of Soy Protein Dispersions, Effect of Heat and Other Factors on Gelation". Essentially this test includes dispersing one part soy protein in 9 parts of water (by weight). After blending and air removal, 320 grams of the solution are sealed in a No. 1, C-lined commercial tinned can, heated at 100° C. for 30 minutes, and ice-bath cooled to room temperature. Thereafter, the viscosity was measured at 25° C. on a Brookfield LVT viscometer. In general, gels have viscosities according to this technique of more than 1,000 poise. A conventional gelling soy protein isolate had a viscosity of about 5,000 poise. The lipid augmented non-gelling protein of this invention had less than 50 poise.

Illustrative of the practice of the invention are the following examples wherein the isolate was prepared as above, having added thereto a minor proportion of a lipid material, i.e., in the manner indicated above.

EXAMPLE 1

Two brines were prepared as follows:

| Ingredient | % | Wt. | % | Wt. |
|---|---|---|---|---|
| Water | 77.622 | 388.11 lb. | 77.622 | 232.86 lb. |
| Pumping Isolate (Lot #9950) | 12.222 | 61.11 | — | — |
| Pumping Isolate (Lot #9767) | — | — | 12.222 | 36.67 |
| Salt | 7.8 | 39.00 | 7.8 | 23.40 |
| Sugar (sucrose) | 1.275 | 6.375 | 1.275 | 3.83 |
| Phosphate | 0.975 | 4.875 | 0.975 | 2.92 |
| NaNitrite | 0.026 | 0.13 | 0.026 | 0.08 |
| NaErythorbate | 0.080 | 0.4 | 0.080 | 0.24 |
| | 100.000 | 500.00 lb. | 100.000 | 300.00 lb. |

The procedure for brine preparation was as follows:

1. For the 500 lb. brine the phosphate was dissolved in 38.11 lbs. of hot tap water while for the 300 lb. batch of brine the phosphate was dissolved in 32.86 lb. of hot tap water.

2. The remainder of the water (either 350 or 200 lbs.) was added to the brine tank and mixing started (two moderate agitation mixers, i.e., portable, propeller type, were used to provide a rolling action).

3. The isolate was added to the water and allowed to wet and disperse for 30 minutes. Manual mixing was employed to initially hydrate all of the material.

4. The poly-phosphate suspension was added to the protein dispersion.

5. The salt (NaCl) was added dry and mixed in.

6. The sugar was added dry and mixed in.
7. The sodium nitrite was added and dispersed.
8. The sodium erythorbate was added and dispersed.

The viscosity of the brines was measured using a Brookfoeld viscometer, Model RVT, after steps #3, 4 and 9 and tabulated below.

Viscosity Characteristics of Brines Containing Pumping Isolate Lot #9950 or 9767 for a 150% Pump.

| Sample | Brine Viscosities | |
|---|---|---|
| | Isolate Lot 9950 | Isolate Lot 9767 |
| Water + Isolate | 10.2 poise | 11.8 poise |
| Water + Isolate + PO | 3.3 poise | 3.9 poise |
| + PO Total Brine | 1.3 poise | 1.45 poise |

HAM INJECTION

The 500 lb. batch of brine was pumped to the stitch injector which was operated at a pressure of 65 psi through 0.032 inch opening needles. The hams (25° F.) which possessed a green weight of 78.875 lbs. were injected 3 times per side in an attempt to attain a proposed weight of 118.32 lbs. (150% pump). The actual pumped weight was 106 lbs., or 134.4% increase over green weight.

MASSAGING

The pumped hams were weighed and placed in the pilot massager. Since 150% pump was not achieved, 13 lbs. of brine was placed in a Lynggaard massager Model 900E with the hams. Four ounces of clove oil (0.05%) was added to the massager. The hams were massaged at 3 rpm for 30¾ hrs. with a 20 min. massage, 10 min. rest, 20 min. reversed massage and 10 min. rest cycle. The ham weight after massaging was 116 lb., representing a total pump of 147.2%.

FURTHER PROCESSING

The hams were removed from the massager, weighed and trimmed. The trimmings amounted to 23.5 lbs. resulting in hams weighing 92.8 lbs., so the trimming loss was 20%. The hams were manually stuffed into casings, air pockets removed and placed in individual spring loaded presses. The hams were cooked in the smokehouse for 4 hours to an internal temperature of 156° F. The dry bulb temperature was 180° F. and the wet bulb temperature was 160° F. The ham weight after cook was 86.6 lbs. The hams exhibited good sliceability besides having the substantially greater weight due to isolate pumping.

The time required for dispersion, although 30 minutes, was substantially less and with the expenditure of considerably less energy and using much simpler equipment, than that required for other commercially available isolates—and even where these were at lower concentrations. Reference to the above identified Meyer and Whitney application Ser. No. 761,424, filed Jan. 21, 1977, reveals the substantial difference in dispersion times between the lipid augmented isolate employed in the practice of this invention and a variety of commercial isolates.

The ensuing examples are based on contract work done at Swift & Co. and the results reported in the December 1976 issue of "Food Processing", pages 60-61.

EXAMPLE 2

The procedure was the same as Example 1 except the pumped and massaged hams were placed in Hoy molds and water cooked to an internal temperature aof 156° F. The cooking yield was 95%. The quality of the hams was excellent. The composition of the hams was 74.29% moisture, 18.85% protein, 3.12% fat and 3.74% for various salts.

EXAMPLE 3

Same as Example 1 except the pumped and massaged hams were stuffed under vacuum in Pullman cans (10 lbs.), hermetically sealed and pasteurized to an internal temperature of 155° F. The cooking yield of the ham was 92%. The quality of the hams was excellent. The composition of the hams was 68.2% moisture, 17.25% protein, 10.22% fat and 4.33% as various salts and residual carbohydrate.

EXAMPLE 4

Same as Example 1 except the lean hams were stitch pumped to 150% of green weight and massaged only to evenly distribute the curing medium already in the hams. The cooking yield of the hams was 92% and excellent quality was again achieved. The composition of the hams was 73.6% moisture, 18.75% protein, 3.10% fat and 4.55% of various salts.

EXAMPLE 5

Same as Example 1 except the lean hams were pumped to 147% of green weight and massaged with additional curing medium to attain a pre-cooked yield of 160% of the green weight. The cooking yield of the hams was 92%. The overall quality of the hams was excellent.

Although the invention has been described in conjunction with the preferred embodiment relating to hams, the inventive procedure is also advantageously applicable to other meat pieces such as shoulders, butts, bacon and turkey breasts.

EXAMPLE 6

In this Example, turkey breasts were stitch pumped with brine containing lipid augmented soy protein isolate. As before, the concentration of the isolate in the brine was high, the formula being:

| Water | 84.0% |
|---|---|
| Isolate | 12.5% |
| Salt | 2.5% |
| Polyphosphate | 1.0% |
| Flavorings | (trace) |

The breasts were pumped to 150%, massaged, stuffed in casings and cooked to an internal temperature of 165° F.

Massaging is highly desirable for two reasons. First, it permits the introduction of more brine (hence, more isolate) when this is not achieved by the stitch pumping. Second, it disperses the protein by breaking up concentrations or pockets thereof—thereby avoiding an undesirable appearance.

The advantages of the invention can be obtained from a wide range of pumping levels and concentrations of lipid augmented isolate. As pointed out previously, the isolate makes possible pumping of substantial amounts of water, viz., 150% but it should also be appreciated that many meat processors find it advantageous to pump more limitedly, viz., of the order of 110% of the green weight. Thus, even very low levels of isolate have utility—and the availability of rapid dispersion makes even these low levels attractive. At the higher levels of isolate, limitations are reached either in terms of the viscosity of the brine or in the economics of meat processing. Normally, it is considered uneconomical to pump a higher concentration than the percent protein in the meat, viz., 17–20%. As a practical matter therefore, we believe the isolate concentrations are optimally in the range of 1–15%.

EXAMPLE 7

It is apparent that the composition of the curing brine is directly related to the extent of pumping of the ham over its green weight provided that one desires to maintain a given total protein content and content of other ingredients in the pumped ham.

Two series of brines of differing salt content were prepared to maintain about equal levels of salt in the meat product at two different pumping levels. Each series consisted of three brines prepared with three different soy protein isolates; (a) the soy isolate of this invention, (b) PROMINE-D, an isolate of the prior art, and (c) SUPRO640T, another isolate of the prior art. One series was designed for 130% pumping of the meat product over green weight, and the other for 150% pumping.

The brines were prepared according to the following formulations:

| BRINE FORMULATIONS | | |
|---|---|---|
| Ingrediate | A (130% Pump) | B (150% Pump) |
| Soy Protein Isolate | 12.222 | 12.222 |
| Sodium Chloride | 11.266 | 7.800 |
| Sucrose | 1.842 | 1.275 |
| Sodium Tripolyphosphate (Kena brand) | 1.408 | 0.975 |
| Sodium Nitrite | 0.037 | 0.026 |
| Sodium Erythorbate | 0.115 | 0.080 |
| Water | 73.110 | 77.622 |
| | 100.000 | 100.000 |

The procedure for preparing the brines A and B was the same as that described in Example 1. After preparation, the six brines were then evaluated for viscosity using a Brookfield Viscometer, Model RVT at 100 RPM. The viscosities of the isolate-containing brines were as shown in the following table.

| BRINE VISCOSITIES IN POISES | | |
|---|---|---|
| Isolate | A (130% Pump) | B (150% Pump) |
| Soy Protein Isolate of this invention | 3.1 | 1.4 |
| SUPRO-640T[a] | 4.7 | 6.7 |
| PROMINE[b] | 10.1 | 11.4 |

[a]Product of Ralston Purina Co.
[b]Product of Central Soya Co.

This example demonstrates one desirable feature of the soy protein isolate described in this invention; namely, low viscosity in curing brines. This low viscosity results in easier injection into the meat product and makes for easier dispersion into the meat tissue during the massaging step as described in Example 1.

While in the foregoing specification a detailed description of the invention has been set down for the purpose of illustration, many variations of the details hereingiven may be made by those skilled in the art without departing from the spirit and scope of the invention.

We claim:

1. A method of brine pumping meat comprising forming a brine with soy protein isolate and water, said isolate having at least 90% protein and being non-gellable upon heating a 10% dispersion of said isolate in water to 100° C. for 30 minutes whereby the thus-heated isolate has, after cooling to 25° C., a viscosity less than 1,000 poise, said isolate having up to about 2% polar lipid material on the surface thereof, and stitch injecting said brine into said meat.

2. The method of claim 1 in which said lipid material is present in an amount of from about 0.2% to about 2.0%.

3. The method of claim 1 in which said isolate is first added to the water to form a dispersion and thereafter a phosphate solution is added thereto.

* * * * *